E. J. Toof.
Revolving Rake.

Nº 84917   Patented Dec. 15, 1868.

Witnesses
W. C. Ashkettle
J. A. Fraser

Inventor
E. J. Toof
per Munn & Co
attorneys

EDWIN J. TOOF, OF FORT MADISON, IOWA.

Letters Patent No. 84,917, dated December 15, 1868.

IMPROVEMENT IN HORSE-RAKES.

The Schedule referred to in these Letters Patent and making part of the same.

*To all whom it may concern:*

Be it known that I, EDWIN J. TOOF, of Fort Madison, in the county of Lee, and State of Iowa, have invented a new and improved Attachment for Revolving Horse-Rakes; and I do hereby declare that the following is a full, clear, and exact description thereof, which will enable others skilled in the art to make and use the same, reference being had to the accompanying drawings, forming a part of this specification, in which—

Similar letters of reference indicate corresponding parts.

The object of this invention is to accomplish the lifting forward of the handle of the rake by means of the combined action of the gate-trip stick and hounds of the rake, so that the draught-strain of the team will cause the handle of the rake to be brought forward by the stop-devices, which action will press down the front of the fingers by means of the spring-device *i*, common to revolving rakes.

The object of bringing forward the handle A, shown in the accompanying plate of drawings, is to permit the front parts of the rake-fingers *a a a*, &c., to be borne downward, in obedience to the movement of the said handle, whereby the fingers will pass under the hay, and gather it up cleanly.

Many devices have been made use of for this purpose, but the one herein set forth has an important feature of superiority, from the fact that its action depends upon the gate *b* and trip-stick *d*, which parts of the mechanism of revolving rakes are more properly the ones to control the action of the handle and rake-fingers, as the said gate and trip-stick are the means of permitting the revolution of the rake-fingers by the backward action of the gate.

The said handle, the trip-stick, and gate, and the rake-fingers, being thus dependent upon each other in all, or nearly all rakes of this class, it will therefore be obvious to all persons experienced in the use of such rakes, that the depressing of the front rake-teeth, or the "pointing," so called, of the same, will be better and more seasonably accomplished by mechanism which depends for its operation directly upon the trip-stick, gate, and hounds of the machine.

I will set forth several of the modifications of my invention.

Figure 1:
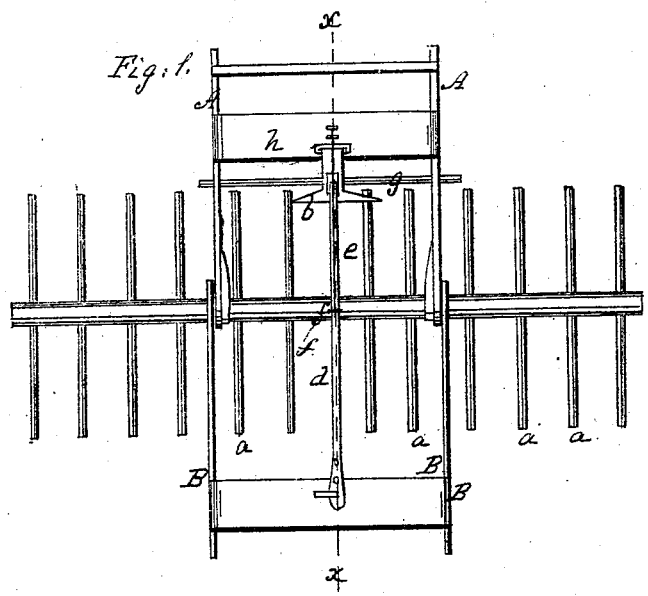
Figure 1 is a plan view of a horse-rake having my improved attachment.
Figure 2:
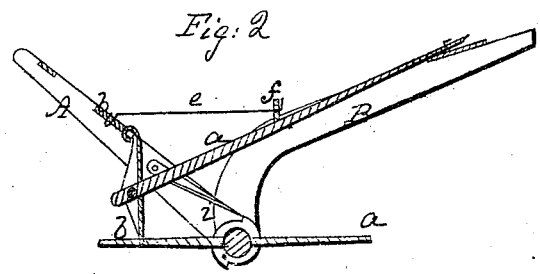
Figure 2 is a section of the same through the line *x x*, fig. 1.

The first is that of a yielding connection between the handles A and trip-stick *d*, or the handle and hounds B, for which purpose a chain, rope, or cord, may be employed to connect the said parts; or the said yielding connection may be obtained by means of a rod hung loosely to the handle, and sliding freely through an eye-bolt or staple on the trip-stick, as shown at fig. 1, *e* being the rod, properly of iron, and *f* the staple on the trip-stick *d*. The rod, in sliding through the staple, will permit the proper forward motion of the handle A when the rake-shaft is to be revolved; but after this latter operation, the rod drawing backward through its staple on the trip-stick, will act as a stop to the backward movement of the handle. When the end of the said rod arrives at the staple, (for the rod terminates in a hook or head, to prevent it from withdrawing completely from connection with the trip-stick,) it acts as a stop to the handle A, and slightly draws the same forward, in obedience to the draught-strain of the team, to which latter it is thus indirectly connected by means of the trip-stick, as aforesaid. This drawing forward of the handle causes the "pointing" or downward pressure of the front points of the rake-fingers.

The second form of my invention is shown also at fig. 1, and is merely a cross-rod, *g*, passing through or affixed to the gate, as shown, whereby it acts as a stop to the forward movement of the gate, and thus actuates the handle A forward, in the manner and for the purpose above set forth. When this rod *g* is used, the rod *e* or chain or cord is not required.

Figure 3:
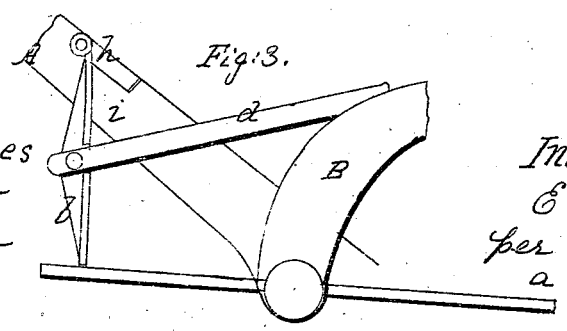
Figure 3 is a detail view of a modified form of my attachment.

The third form is shown in the detail view of fig. 3, and consists in hinging or pivoting the gate to the back and upper edge of any suitable cross-piece, *h*, of the handle, as shown, the said cross-piece being provided with any suitable projection, *i*, or other equivalent device for producing the aforesaid stop to the forward movement of the gate, when the latter has reached the proper point, and thus actuating the handle forward, and thereby pointing the rake-fingers downward, as aforesaid.

This principle of employing the gate, as above set forth, might be variously modified, but I desire to be understood as not limiting myself to the precise construction and devices above described; for, should I be so limited, my Letters Patent, if obtained, would be easily evaded by the employment of other devices, which would be, in reality, mere substitutions, if their function was to cause the gate to act as a stop, for the purpose of bringing forward the handle A by means of the draught-strain of the team.

My invention is easily attached to the revolving rakes now in use, without materially altering the form or construction of the same.

Having thus described my invention,

I claim as new, and desire to secure by Letters Patent—

1. A stop, to arrest the gate in its forward movement, formed by the rod *g*, or its equivalent, substantially as described, for the purpose specified.

2. The yielding connection *e*, substantially as shown and described, in combination with the trip-stick *d*, hounds B, and the handle A, of a revolving horse-rake, all as and for the purpose set forth.

The above specification of my invention signed by me, this 4th day of March, 1868.

E. J. TOOF.

Witnesses:
C. B. THOMPSON,
ALEX. F. ROBERTS.